(12) United States Patent
Koti et al.

(10) Patent No.: US 7,831,826 B2
(45) Date of Patent: *Nov. 9, 2010

(54) METHOD AND SYSTEM FOR DISTRIBUTING SECURITY POLICIES

(75) Inventors: Shirish Koti, Redmond, WA (US); Narasimha Rao S. S. Nagampalli, Kirkland, WA (US); Maxim Alexandrovich Ivanov, Redmond, WA (US); Sachin C. Sheth, Bothell, WA (US); Emanuel Paleologu, Kirkland, WA (US); Yun Lin, Bellevue, WA (US); Eric Erwin Youngblut, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/402,448

(22) Filed: Mar. 11, 2009

(65) Prior Publication Data

US 2009/0172774 A1    Jul. 2, 2009

Related U.S. Application Data

(63) Continuation of application No. 10/993,688, filed on Nov. 19, 2004, now Pat. No. 7,509,493.

(51) Int. Cl.
*G06F 9/00* (2006.01)
*H04L 9/00* (2006.01)

(52) U.S. Cl. .......................... 713/166; 726/11

(58) Field of Classification Search ............... 713/166, 713/164
See application file for complete search history.

(56) References Cited

U.S. PATENT DOCUMENTS

| 5,968,175 | A | 10/1999 | Morishita et al. |
|---|---|---|---|
| 5,968,176 | A | 10/1999 | Nessett et al. |
| 7,509,493 | B2 * | 3/2009 | Koti et al. .................. 713/166 |
| 2002/0138726 | A1 | 9/2002 | Sames |
| 2004/0181690 | A1 | 9/2004 | Rothermel |
| 2006/0129808 | A1 | 6/2006 | Koti et al. |
| 2007/0204154 | A1 | 8/2007 | Swander et al. |

OTHER PUBLICATIONS

European Search Report for European Patent Application No. 05110420.6, Microcoft Corporation, Mar. 28, 2007 (3 pages).

* cited by examiner

*Primary Examiner*—Matthew B Smithers
(74) *Attorney, Agent, or Firm*—Perkins Coie LLP (57) ABSTRACT

A method and system for distributing and enforcing security policies is provided. A firewall agent executing at a host computer system that is to be protected receives security policies for the enforcement engines responsible for enforcing the security policies on the host computer system. A security policy has rules that each provide a condition and action to be performed when the condition is satisfied. A rule also has a rule type that is used by the distribution system to identify the security components that are responsible for enforcing the rules. To distribute the security policies that have been received at a host computer system, the firewall agent identifies to which enforcement engine a rule applies based in part on rule type. The firewall agent then distributes the rule to the identified enforcement engine, which then enforces the rule.

20 Claims, 5 Drawing Sheets

METHOD AND SYSTEM FOR DISTRIBUTING SECURITY POLICIES

CROSS REFERENCE TO RELATED APPLICATION

This application is a continuation application of U.S. patent application Ser. No. 10/993,688, filed on Nov. 19, 2004, entitled "METHOD AND SYSTEM FOR DISTRIBUTING SECURITY POLICIES," which is incorporated herein in its entirety by reference.

TECHNICAL FIELD

The described technology relates generally to systems that prevent the exploitation of vulnerabilities of computer systems.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an organization, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection system may take action to prevent the exploitation, such as dropping the message.

Signatures for newly discovered exploitations of vulnerabilities can be created in different ways. Developers of intrusion detection systems may create and distribute new signatures when they become aware of new exploitations. An administrator can then install the new signatures to prevent the exploitation. A developer may not, however, provide signatures for all known exploitations. For example, the vulnerability may be in a special-purpose application program that the developer does not support. To prevent exploitation of such a vulnerability, intrusion detection systems may allow administrators to create their own signatures.

A set of one or more signatures may be considered a security policy. Developers of intrusion detection systems may provide various security policies. For example, a developer may provide one security policy that defines signatures of vulnerabilities of an operating system and many other security policies that are specific to an application or a class of applications. Similarly, an administrator may define a security policy that is specific to custom applications used by the enterprise.

Because intrusions can occur at various points within an operating system or an application, intrusion detection systems have been developed to detect and prevent exploitation of vulnerabilities at each of these points. For example, an intrusion detection system may be developed to prevent exploitation of vulnerabilities that can be detected at the network layer of a communication protocol, and another intrusion detection system may be developed to prevent exploitation of vulnerabilities that can be detected when a file is accessed. Each developer of an intrusion detection system can provide their own implementation and security policies that need to be distributed to each computer system to be protected. In addition, any updates to the implementation or security policies also need to be distributed to the computer systems to be protected.

The distribution and updating of security policies for an enterprise with a large number of computer systems can be a complex and time-consuming task. Each security policy needs to be provided to each computer system and then to the appropriate intrusion detection system that is installed on the computer system. Since the developers of intrusion detection systems typically develop their systems independent of each other, each intrusion detection system may have a proprietary mechanism for defining and distributing security policies. A system administrator of an enterprise may need to be aware of each of these mechanisms to use the intrusion detection system effectively.

It would be desirable to have a mechanism that would provide a uniform way to distribute security policies received at a computer system to components responsible for enforcing the security policies.

SUMMARY

A method and system for distributing and enforcing security policies is provided. A distributed firewall system includes a policy server component, firewall agents, and enforcement engines. A firewall agent executing at a host computer system that is to be protected receives from the policy server component security policies for the enforcement engines responsible for enforcing the security policies on the host computer system. A security policy has rules that each provide a condition and action to be performed when the condition is satisfied. A rule also has a rule type (also referred to as a security type) that is used by the firewall agent to identify the enforcement engines that are responsible for enforcing the rules. The firewall agent may distribute the security policies to enforcement engines executing in user mode and in kernel mode. The enforcement engines may provide a layered approach to security enforcement. To distribute the security policies that have been received at a host computer system, the firewall agent identifies to which enforcement engine a rule applies based in part on rule type. The firewall agent then distributes the rule to the identified enforcement engine, which then enforces the rule.

DETAILED DESCRIPTION

A method and system for distributing and enforcing security policies is provided. A distributed firewall system includes a policy server component, firewall agents, and enforcement engines. A firewall agent executing at a host computer system that is to be protected receives from a policy server security policies for the enforcement engines responsible for enforcing the security policies on the host computer system. A security policy has an execution scope and associated rules. An execution scope defines the attributes of a process or application to which the associated rules are to be applied. A rule provides a condition and action to be performed when the condition is satisfied. A rule also has a rule type (also referred to as a security type) that is used by the firewall agent to identify the enforcement engines that are responsible for enforcing the rules. The firewall agent may distribute the security policies to enforcement engines executing in user mode and in kernel mode. The enforcement engines may provide a layered approach to a distributed firewall. For example, enforcement engines may be installed on a host computer system to prevent intrusions at various layers of the ISO 7-layer reference model. The network layer, the transport layer, and the session layer may each have an enforcement engine that is developed to detect attempted intrusions at that layer. To distribute the security policies that have been received at a host computer system, the firewall agent identifies to which enforcement engine a rule applies based in part on rule type. The firewall agent then distributes the rule to the identified enforcement engine, which then enforces the rule. Upon receiving a rule, an enforcement engine may distribute the rule to its subcomponents as appropriate. For example, the firewall agent may distribute all rules destined for kernel-mode enforcement engines to a single kernel-mode security component that then distributes the rules to the enforcement engines. In this way, the distributed firewall system provides a single mechanism for distributing rules of security policies to the enforcement engines providing different layers of protection for a host computer system.

In one embodiment, a security policy includes rules that specify conditions, actions, and optionally exceptions. For example, a rule may indicate that an application may not receive messages on any network port other than port 80. The condition of the rule may be satisfied when a message is received on a network port other than port 80, and the action may result in the message being discarded. As another example, a rule may indicate that when an application attempts to send a message on network port 80, authorization is to be solicited from a user of the computing system on which the rule is enforced. The rules may be categorized into rule or security types based on their behavior. For example, rules with a network security type may be directed to security enforcement for network traffic. Each security type may have its own security component for enforcing rules of that security type. Languages for specifying security policies is described in U.S. patent application Ser. No. 10/882,438, entitled "Languages for Expressing Security Policies" and filed on Jul. 1, 2004, which is hereby incorporated by reference.

The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false.

Figure 1:
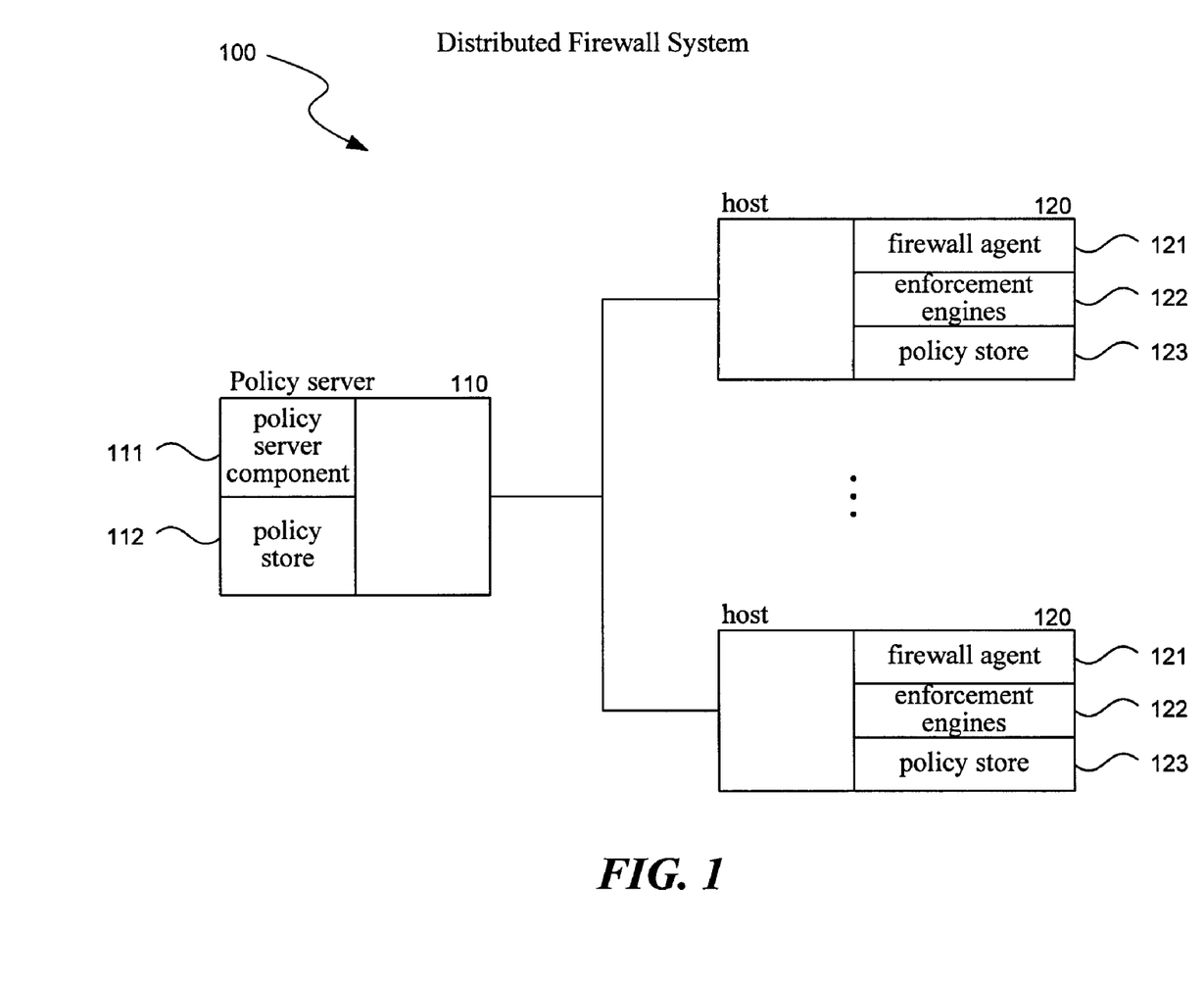
FIG. 1 is a block diagram that illustrates the distributed firewall system in one embodiment.

FIG. 1 is a block diagram that illustrates the distributed firewall system in one embodiment. An enterprise may have a network system 100 that includes a policy server computer system 110 and host computer systems 120. A system administrator uses a policy server component 111 of the policy server computer system to prepare and distribute security policies stored in a security policy store 112 to the host computer systems. Each host computer system includes a firewall agent 121, enforcement engines 122, and a policy store 123. The firewall agent provides a central mechanism through which a host computer system receives and distributes security policies to the enforcement engines of that host computer system. Upon receiving a security policy from the policy server computer system, the firewall agent of a host computer system stores the security policy in the policy store. The firewall agent then processes the security policies on a rule-by-rule basis and provides the rules to the appropriate enforcement engine. The firewall agent may combine various security policies, order the rules of the security policies, and dynamically notify the enforcement engines of changes to security policies or system configurations that will affect the enforcement of the security policies. Such combining, ordering, and notifying is described in U.S. patent application Ser. No. 10/966,800, entitled "Method and System for Merging Security Policies" and filed on Oct. 14, 2004, which is hereby incorporated by reference. The enforcement engines then enforce the rules by applying them to network events. The enforcement engines may provide various type of security enforcement. An enforcement engine may detect an attempt to perform a certain behavior and block the attempt. For example, an application that is infected with a virus may attempt to delete certain files of the operating system. A security engine executing in the same process space as the application may detect and block the attempt to delete the file. A security engine for performing behavior blocking is described in U.S. patent application Ser. No. 10/832,798, entitled "A Method and System for Enforcing a Security Policy via a Security Virtual Machine" and filed on Apr. 27, 2004, which is hereby incorporated by reference. The enforcement engines may be adapted to apply rules to network events of various protocols, such as IP, ICMP, TCP, FTP, DNS, HTTP, RPC, and so on. Techniques preventing exploitation of vulnerabilities are described in U.S. patent application Ser. No. 10/955,963, entitled "Method and System for Filtering Communications to Prevent Exploitation of a Software Vulnerability" and filed on Sep. 30, 2004, which is hereby incorporated by reference.

Figure 2:
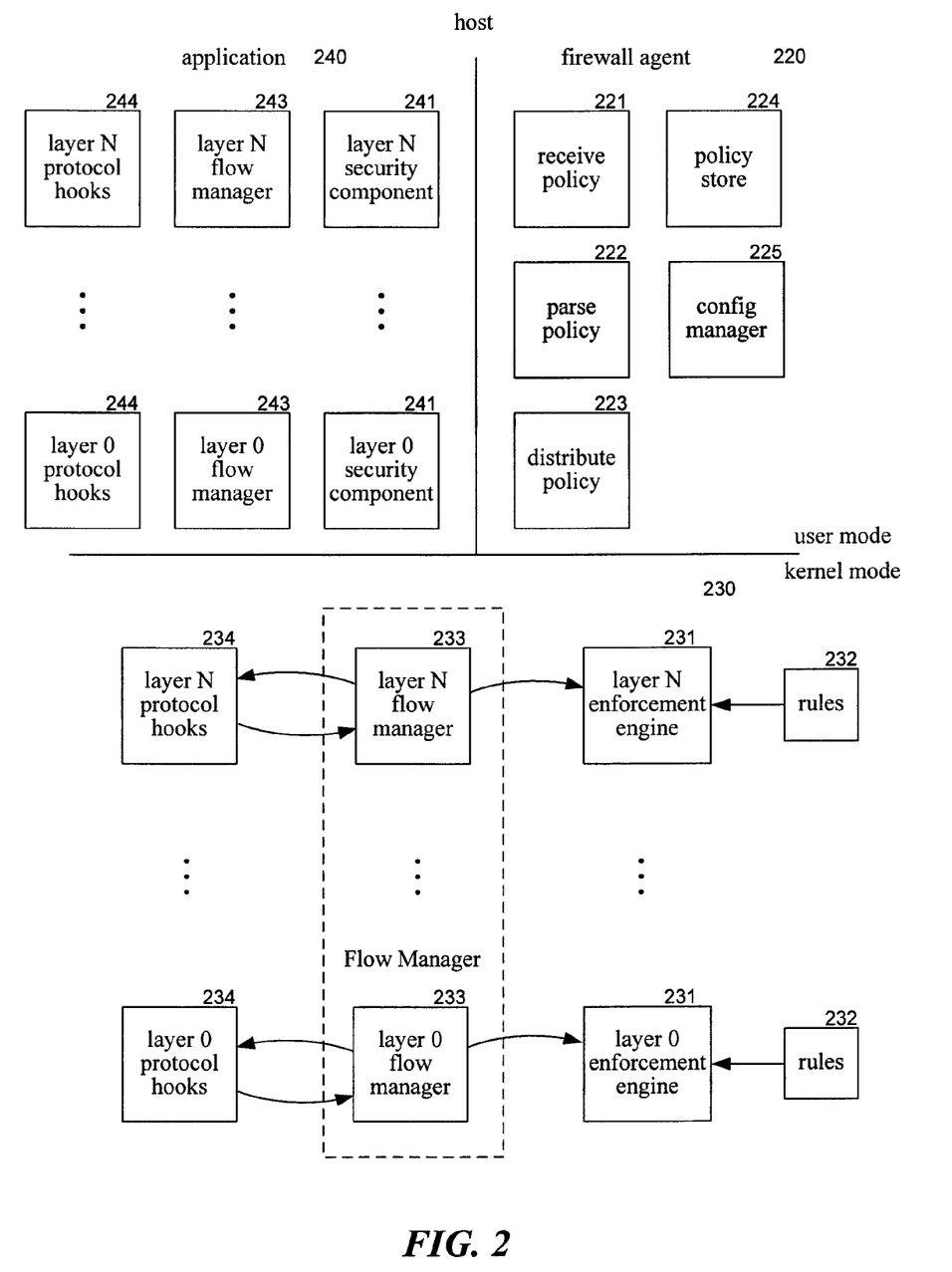
FIG. 2 is a block diagram that illustrates the components of the portions of the distributed firewall system executing on a host computer system in one embodiment.

FIG. 2 is a block diagram that illustrates the components of the distributed firewall system executing on a host computer system in one embodiment. The host computer system includes firewall agent components 220, kernel-mode components 230, and application user-mode components 240. The firewall agent components include a receive policy component 221, a parse policy component 222, and a distribute policy component 223. The firewall agent components also include a policy store 224 and a configuration manager 225. The receive policy component receives security policies provided by the policy server computer system and stores the policies in the policy store. The parse policy component retrieves the policies from the policy store and converts them to a lower-level language for processing by the enforcement engines. The distribute policy component receives the parsed security policies and distributes the rules of the security policies to the appropriate enforcement engines. The configuration manager provides configuration information for use in determining which rules should be distributed to which enforcement engines based on the current configuration of the host computer system.

The kernel-mode components include enforcement engines 231, flow manager components 233, and protocol hooks 234. The components may be layered from layer 0 to layer N, which may correspond to various layers of the ISO 7-layer reference model. Each layer may have an associated protocol hook, flow manager, and enforcement engine that is specific to the layer, parses network events specific to that layer, and enforces the rules provided by the firewall agent to that layer. The rules for each layer are stored in a rule store 232 that may be specific for that layer. The flow manager components are responsible for intercepting network events and invoking the corresponding enforcement engine to enforce the rules. Each flow manager component receives network events from the corresponding protocol hook that is responsible for detecting network events at the corresponding layer. The application user-mode components may be provided as a dynamic link library that links into an application for providing layered security in a manner that is similar in overall architecture to the kernel-mode components.

The computing device on which the distribution system is implemented may include a central processing unit, memory, input devices (e.g., keyboard and pointing devices), output devices (e.g., display devices), and storage devices (e.g., disk drives). The memory and storage devices are computer-readable media that may contain instructions that implement the distribution system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The distribution system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The host computer systems may be cell phones, personal digital assistants, smart phones, personal computers, programmable consumer electronics, digital cameras, and so on.

The distribution system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
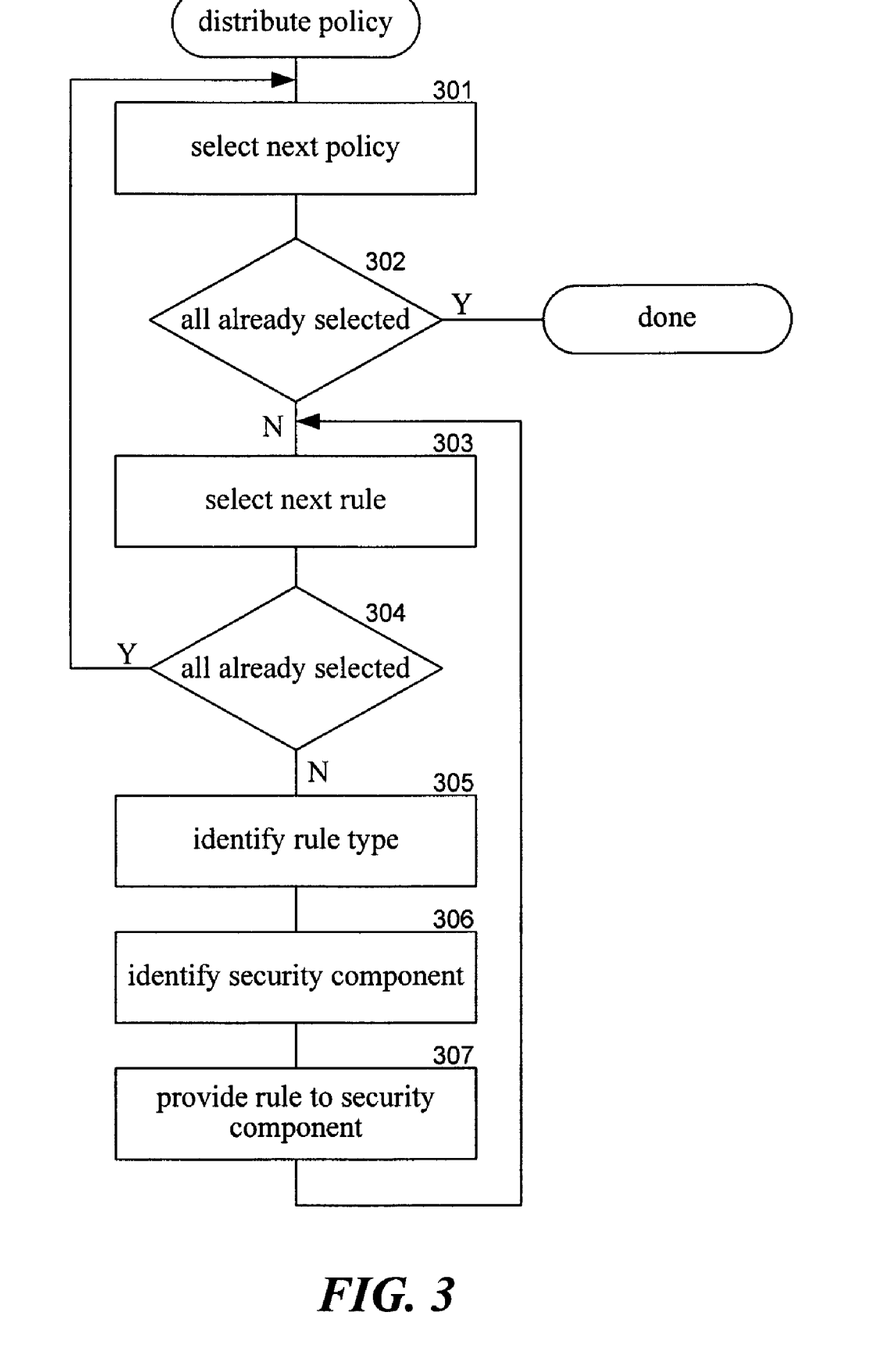
FIG. 3 is a flow diagram that illustrates the processing of the distribute policy component of the firewall agent in one embodiment.

FIG. 3 is a flow diagram that illustrates the processing of the distribute policy component of the firewall agent in one embodiment. Upon receiving policies from the parse policy component, the component identifies the enforcement engines to which the rules apply and distributes the rules to the identified enforcement engines. In blocks 301-307, the component loops selecting the security policies. In block 301, the component selects the next security policy. In decision block 302, if all the security policies have already been selected, then the component completes, else the component continues at block 303. In blocks 303-307, the component loops processing each rule within the selected security policy. In block 303, the component selects the next rule of the selected security policy. In decision block 304, if all the rules of the selected security policy have already been selected, then the component loops to block 301 to select the next security policy, else the component continues at block 305. In block 305, the component identifies the rule type (or security type) of the selected security rule. In block 306, the component identifies the enforcement engine that is responsible for enforcing the rules of the identified rule type. In block 307, the component provides the selected rule to the identified component and then loops to block 303 to select the next rule of the selected security policy.

Figure 4:
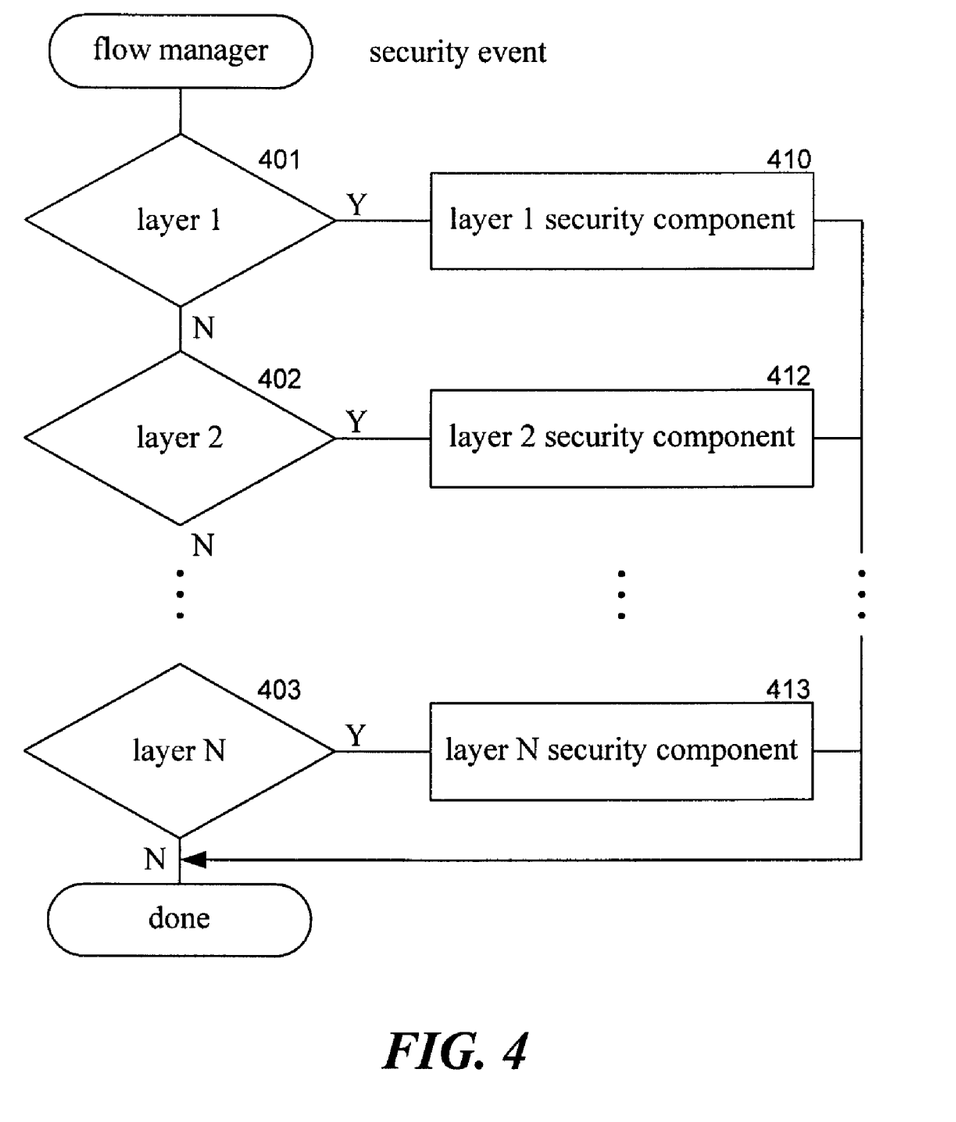
FIG. 4 is a flow diagram that illustrates the processing of the flow manager component in one embodiment.

FIG. 4 is a flow diagram that illustrates the processing of the flow manager component in one embodiment. The flow manager component is passed a network event and invokes the appropriate enforcement engine for processing the network event. The flow manager component may be implemented as a separate flow manager for each layer that processes network events only for that layer or may be implemented as a single flow manager component that process network events for all layers. In this illustrated embodiment, the flow manager component processes all network events for all layers. In decision blocks 401-403, the component identifies the layer to which a network event applies. The component then invokes the associated enforcement engine for that layer in blocks 411-413. The component then completes. The flow manager may maintain a separate flow for each network connection. The enforcement engines and flow managers may be specific to the layer and the protocol implemented by the layer. For example, when a connection uses the Transmission Control Protocol ("TCP") or the User Datagram Protocol ("UDP") at the packet layer, the flow manager invokes the enforcement engine that is appropriate for the protocol. The invoked enforcement engines may instantiate data structures for tracking state information from one invocation to the next. Each application that is protected by user-mode enforcement engine may also have a flow manager with a separate flow for each connection.

Figure 5:
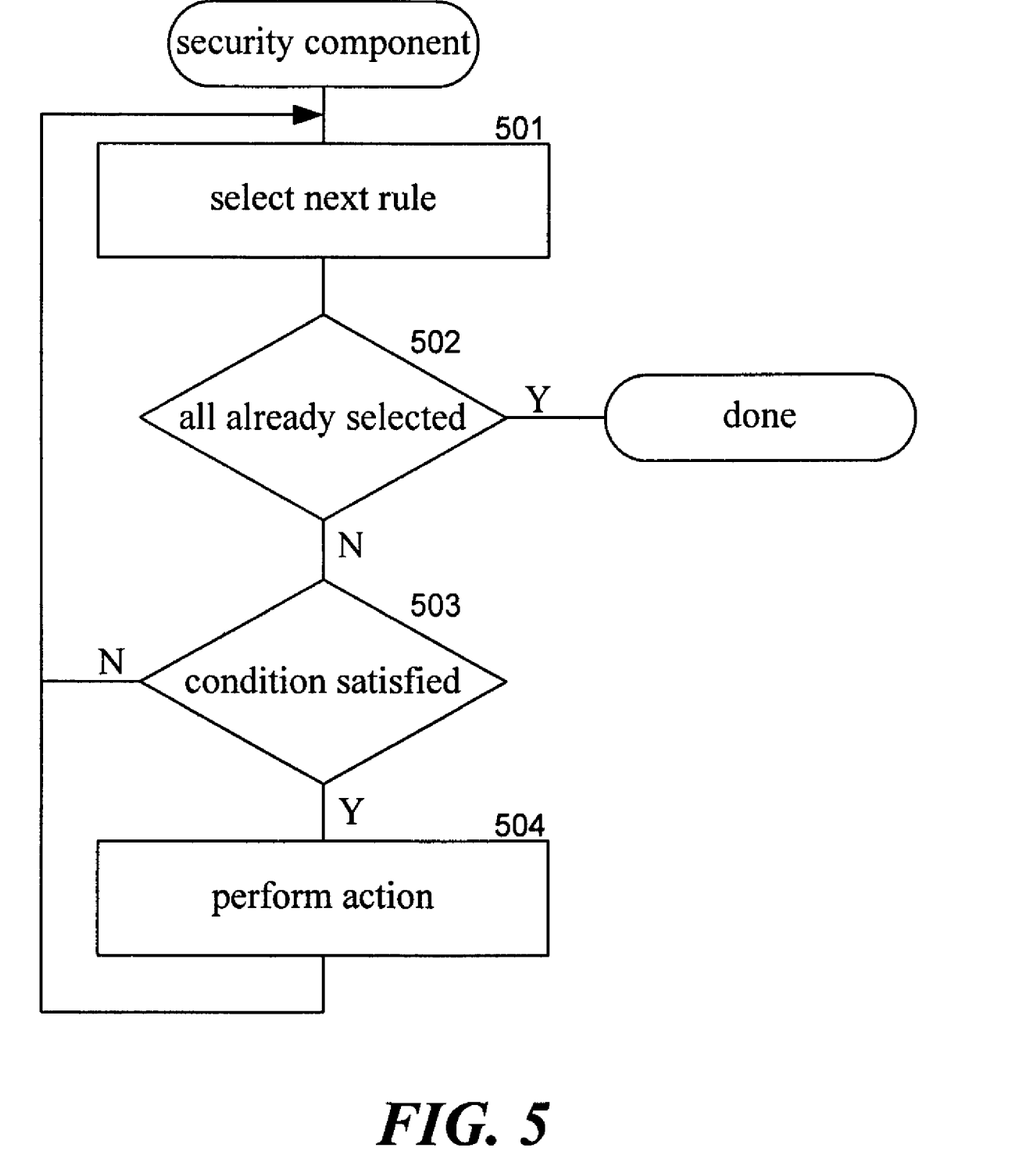
FIG. 5 is a flow diagram that illustrates the processing of a enforcement engine for a specific layer in one embodiment.

FIG. 5 is a flow diagram that illustrates the processing of an enforcement engine for a specific layer in one embodiment. The enforcement engine, which is a component of the distributed firewall system, is provided a network event, identifies the rules to apply to the event, determines whether the conditions of the rules are satisfied, and if so, performs the action associated with the rule. In blocks 501-504, the component loops selecting each rule associated with the layer of the enforcement engine. In block 501, the component selects the next rule. In decision block 502, if all the rules have already been selected, then the component completes, else the component continues at block 503. In decision block 503, if the condition of the rule is satisfied, then the component continues at block 504, else the component loops to block 501 to select the next rule. In block 504, the component performs the action associated with the rule and then loops to block 501 to select the next rule. Each enforcement engine may be adapted to process the network events and rules that are appropriate to its layer. For example, an enforcement engine for the network layer may parse network packets and enforce rules related to the network packets. An enforcement engine for the application layer may detect unauthorized attempts to access or modify files relating to that application.

From the foregoing, it will be appreciated that specific embodiments of the distributed firewall system have been described herein for purposes of illustration, but that various modifications may be made without deviating from the spirit and scope of the invention. Accordingly, the invention is not limited except as by the appended claims.

We claim:

1. A computer-readable storage medium where the medium is not a signal containing instructions for controlling a computing device to distribute rules of security policies to enforcement engines executing on the computing device for enforcing the security policies, by a method comprising:
   providing at the computing device enforcement engines that implement different layers of security enforcement; receiving and storing at the computing device security policies having rules, each rule having a rule type; under control of a firewall agent executing on the computing device, retrieving the stored security policies; and for rules of a retrieved security policy, identifying an enforcement engine to which a rule applies based on the rule type of the rule; and providing the rule to the identified enforcement engine; and under control of the enforcement engines executing on the computing device, storing the rules provided to the enforcement engine by the firewall agent; under control of a flow manager executing on the computing device, receiving a network event; identifying an enforcement engine that is responsible for enforcing its rules against the network event; and providing the network event to the identified enforcement engine; under control of the enforcement engines executing on the computing device, when a network event is provided to the enforcement engine, enforcing the rules provided to the enforcement engine by the firewall agent against the network event provided by the flow manager, wherein the firewall agent provides a mechanism for distributing the rules to multiple enforcement engines of the computing device, the flow manager distributes network events to enforcement engines, and each enforcement engine enforces its provided rules against the network events that it is provided.

2. The computer-readable storage medium of claim 1 wherein the security policies are received from policy computer system that distributes the security policies for multiple computing devices.

3. The computer-readable storage medium of claim 1 wherein the enforcement engines provide a layered firewall.

4. The computer-readable storage medium of claim 1 wherein the enforcement engines include a behavior blocking security component.

5. The computer-readable storage medium of claim 1 wherein an enforcement engine includes subcomponents and wherein upon being provided with a rule, the enforcement engine provides the rule to a subcomponent.

6. The computer-readable storage medium of claim 1 wherein at least one enforcement engine executes in kernel mode and at least one enforcement engine executes in user mode.

7. The computer-readable storage medium of claim 1 wherein the firewall agent includes a user-mode subcomponent and a kernel-mode subcomponent, and the user-mode subcomponent distributes rules to the kernel-mode subcomponent for providing the rules to enforcement engines that execute in kernel mode.

8. The computer-readable storage medium of claim 1 wherein a flow manager component intercepts network events at the various layers and invokes an enforcement engine associated with a layer to enforce the rules for that layer.

9. The computer-readable storage medium of claim 8 wherein a single flow manager component handles network events from multiple layers.

10. The computer-readable storage medium of claim 8 wherein a flow manager component handles network events from only one layer.

11. The computer-readable storage medium of claim 1 wherein enforcement engines provide for security at various layers of a network protocol stack.

12. The computer-readable storage medium of claim 1 wherein layers of different enforcement engines are used for different connections.

13. A computer-readable storage medium where the medium is not a signal containing instructions for controlling a host computer system to distribute rules of security policies to enforcement engines for enforcing the security policies of the host computer system, comprising:

multiple enforcement engines that implement different layers of firewall security enforcement at the host computer system by receiving and enforcing rules of security policies; a firewall agent component that receives at the host computer system security policies having rules, each rule having a rule type, that identifies enforcement engines to which a rule applies based on the rule type of the rule and that provides the rule to the identified enforcement engine; and a flow manager component that intercepts network events and invokes an appropriate enforcement engine to enforce its rules against the network event wherein a mechanism is provided for distributing the rules to the layered enforcement engines of the host computer system.

14. The computer-readable storage medium of claim 13 wherein the security policies are received from a policy computer-readable storage medium that distributes the security policies for multiple host computer-readable storage mediums.

15. The computer-readable storage medium of claim 13 wherein the enforcement engine includes a behavior blocking security component.

16. The computer-readable storage medium of claim 13 wherein an enforcement engine includes subcomponents and wherein upon being provided with a rule, the enforcement engine provides the rule to a subcomponent.

17. The computer-readable storage medium of claim 13 wherein at least one enforcement engine executes in kernel mode and at least one enforcement engine executes in user mode.

18. The computer-readable storage medium of claim 13 wherein the component that provides the rules to the enforcement engines includes a user-mode subcomponent and a kernel-mode subcomponent, and the user-mode subcomponent distributes rules to the kernel-mode subcomponent for providing the rules to enforcement engine that execute in kernel mode.

19. The computer-readable storage medium of claim 13 including a flow manager component that intercepts network events at the various layers and invokes an enforcement engine associated with a layer to enforce the rules for that layer.

20. The computer-readable storage medium of claim 19 wherein a single flow manager component handles network events from multiple layers.

* * * * *